United States Patent
Baek et al.

(10) Patent No.: US 10,562,622 B2
(45) Date of Patent: Feb. 18, 2020

(54) APPARATUS AND METHOD FOR CONTROLLING STABILITY OF UNMANNED AERIAL VEHICLE

(71) Applicant: UNIST(ULSAN NATIONAL INSTITUTE OF SCIENCE AND TECHNOLOGY), Ulsan (KR)

(72) Inventors: Woongki Baek, Ulsan (KR); Seong Beom Park, Ulsan (KR)

(73) Assignee: UNIST (ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 535 days.

(21) Appl. No.: 15/415,969

(22) Filed: Jan. 26, 2017

(65) Prior Publication Data

US 2018/0044016 A1 Feb. 15, 2018

(30) Foreign Application Priority Data

Aug. 11, 2016 (KR) .......................... 10-2016-0102334

(51) Int. Cl.
*B64C 27/08* (2006.01)
*B64C 39/02* (2006.01)
*B64C 27/14* (2006.01)

(52) U.S. Cl.
CPC ............ *B64C 39/024* (2013.01); *B64C 27/08* (2013.01); *B64C 27/14* (2013.01); *B64C 2201/027* (2013.01); *B64C 2201/042* (2013.01); *B64C 2201/108* (2013.01); *B64C 2201/14* (2013.01); *B64C 2201/165* (2013.01)

(58) Field of Classification Search
CPC ........ B64C 39/024; B64C 27/08; B64C 27/14
See application file for complete search history.

(56) References Cited

U.S. PATENT DOCUMENTS

| 8,646,720 B2 * | 2/2014 | Shaw | B64C 29/0025 244/17.23 |
| D751,491 S * | 3/2016 | Chen | D12/16.1 |
| 9,821,909 B2 * | 11/2017 | Moshe | B64C 3/38 |

(Continued)

FOREIGN PATENT DOCUMENTS

| CN | 204507252 | 7/2015 |
| CN | 205044942 | 2/2016 |
| KR | 10-2016-0046582 | 4/2016 |

*Primary Examiner* — Justin M Benedik
(74) *Attorney, Agent, or Firm* — Lex IP Meister, PLLC (57) ABSTRACT

The present invention provides an unmanned aerial vehicle that can maintain stability by changing positions of rotating rotors when one of the rotating rotors malfunctions, and a method for controlling stability of the unmanned aerial vehicle. The unmanned aerial vehicle includes: a main body; a plurality of support bars that are arranged while forming an angle with each other along a circumferential direction of the main body and extended to an outer side from the main body; a plurality of rotating rotors that are respectively provided to the support bars and generate thrust; motors that are respectively connected to the rotating rotors to drive the rotating rotors; drivers that change positions of the respective rotating rotors along the circumferential direction of the main body by moving the support bars with respect to the main body; and a controller that maintains horizontal stability of the main body by controlling the drivers.

10 Claims, 6 Drawing Sheets

(56) References Cited

U.S. PATENT DOCUMENTS

2009/0008499 A1\* 1/2009 Shaw .................. B64C 27/20
244/17.23
2015/0298788 A1\* 10/2015 Wang .................. B64C 39/028
701/3
2016/0159471 A1 6/2016 Chan et al.

\* cited by examiner

APPARATUS AND METHOD FOR CONTROLLING STABILITY OF UNMANNED AERIAL VEHICLE

CROSS-REFERENCE TO RELATED APPLICATION

This application claims priority to and the benefit of Korean Patent Application No. 10-2016-0102334 filed in the Korean Intellectual Property Office on Aug. 11, 2016, the entire contents of which are incorporated herein by reference.

BACKGROUND OF THE INVENTION (a) Field of the Invention

The present invention relates to an unmanned aerial vehicle. More particularly, the present invention relates to an unmanned aerial vehicle that can be easily balanced when the vehicle malfunctions, and a method for controlling stability of the unmanned aerial vehicle.

(b) Description of the Related Art

In general, an unmanned aerial vehicle (UAV), which is called a drone, is an aerial vehicle that files by radio-control without carrying a human pilot, and the use of unmanned aerial vehicles for various purposes such as aerial photography, transportation of goods, and the like has explosively increased.

The unmanned aerial vehicle is equipped with a plurality of rotation rotors that generate thrust. The rotating rotors are arranged with a constant angle therebetween along a circumferential direction with respect to a main body of the unmanned aerial vehicle. Thus, the unmanned aerial vehicle can stably maintain a balanced state by the rotating rotors that are arranged with such a constant angle therebetween, and thrust generated from the respect rotating rotors can be controlled by controlling a driving motor that is individually connected to each rotating rotor, thereby enabling the unmanned aerial vehicle to fly in a desired position.

However, a conventional unmanned aerial vehicle is small-sized and stability of the small-sized unmanned aerial vehicle cannot be easily controlled, and when one of the plurality of rotating rotors malfunctions and thus stops operating, the horizontal stability cannot be maintained, thereby causing a crash.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an unmanned aerial vehicle that can maintain stability by changing positions of rotating rotors when one of the rotating rotors malfunctions, and a method for controlling stability of the unmanned aerial vehicle.

Further, the present invention provides an unmanned aerial vehicle that can conveniently and promptly deal with an emergency situation that may occur during flight, and a method for controlling stability of the unmanned aerial vehicle.

An unmanned aerial vehicle according to an exemplary embodiment of the present invention may include: a main body; a plurality of support bars that are arranged while forming an angle with each other along a circumferential direction of the main body and extended to an outer side from the main body; a plurality of rotating rotors that are respectively provided to the support bars and generate thrust; and motors that are respectively connected to the rotating rotors to drive the rotating rotors.

The unmanned aerial vehicle may further include drivers that change positions of the respective rotating rotors along the circumferential direction of the main body by moving the support bars with respect to the main body and a controller that maintains horizontal stability of the main body by controlling the drivers.

The controller may control the driver to place the center of thrust generated from the rotating rotor at the center of mass of the unmanned aerial vehicle.

Each driver may include a shaft member that is rotatably coupled to the main body by means of a shaft and a rotation device that is provided between the main body and the shaft member to rotate the shaft member with respect to the main body.

The rotation device may include a driving cylinder that is connected between the shaft member and the main body and may rotate the shaft member by being expanded according to a control signal of the controller.

The controller may further include a sensor that detects whether or not each rotating rotor rotates and applies a detection result to the controller.

The driver may further include a rotation unit that changes an inclination of each rotating rotor by rotating the support bar with respect to the shaft direction.

The support bar may be provided in the rotation unit to be rotatable with respect to the shaft member, a driven gear may be provided in the support bar along a circumferential surface of the support bar, and a driving gear that is engaged with the driven gear and a forward motor that rotates the driving gear may be provided in the shaft member.

The controller may control yawing movement of the main body by driving the forward motor.

According to another exemplary embodiment of the present invention, a method for controlling stability of an unmanned aerial vehicle is provided. The unmanned aerial vehicle includes a main body, a plurality of support bars that are arranged while forming an angle with each other along a circumferential direction of the main body and extended to an outer side from the main body, a plurality of rotating rotors that are respectively provided in the support bars and generate thrust, and motors that are respectively connected to the rotating rotors to drive the rotating rotors. The method includes: detecting whether or not each rotating rotor provided in the main body abnormally operates and controlling for rearranging the respective rotating rotors by moving positions of the rotating rotors along a circumference direction of the main body when an abnormality is detected in the rotating rotors.

In the controlling, the positions of the rotating rotors may be moved to locate the center of thrust of the unmanned aerial vehicle at the center of mass of the unmanned aerial vehicle.

The controlling may further include controlling yawing movement for changing an inclination of a rotating rotor by rotating the corresponding support in a shaft direction.

According to the exemplary embodiments of the present invention, when a problem occurs in one of rotating rotors during flight, other normally operating rotating rotors are relocated to assure horizontal stability such that the unmanned aerial vehicle can fly with the other normally operating rotating rotors.

Accordingly, the unmanned aerial vehicle can be prevented from being crushed by promptly handling an emergency situation, thereby minimizing a risk of an accident.

DETAILED DESCRIPTION OF THE EMBODIMENTS

The terminologies used herein are set forth to illustrate a specific exemplary embodiment, but do not intend to limit the present invention. Singular expressions used herein include plural expressions unless they have definitely opposite meanings. It will be further understood that the terms "comprises" and/or "comprising," when used in this specification, specify the presence of stated properties, regions, integers, steps, operations, elements, and/or components, but do not preclude the presence or addition of one or more other properties, regions, integers, steps, operations, elements, components, and/or groups.

Hereinafter, the present invention will be described more fully hereinafter with reference to the accompanying drawings, in which exemplary embodiments of the invention are shown. As easily understood by the person with ordinary skill in the art to which the present invention pertains, the exemplary embodiments which will be described below may be variously modified without departing from the spirit and the scope of the present invention. As those skilled in the art would realize, the described embodiments may be modified in various different ways, all without departing from the spirit or scope of the present invention.

Figure 1:
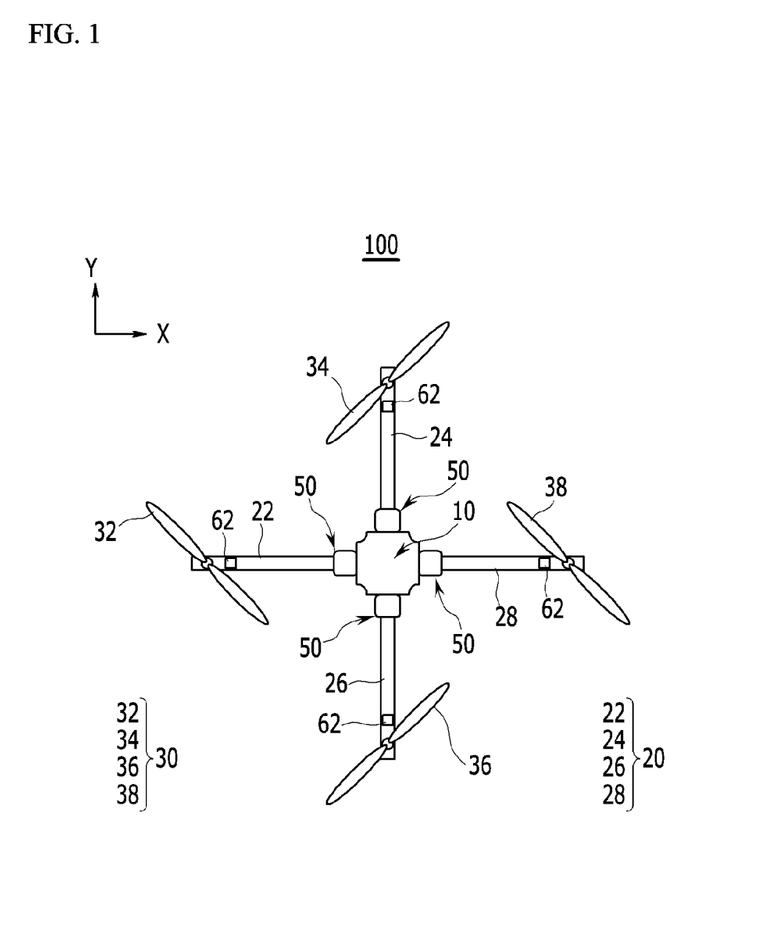
FIG. 1 schematically illustrates an unmanned aerial vehicle according to an exemplary embodiment of the present invention.
Figure 2:
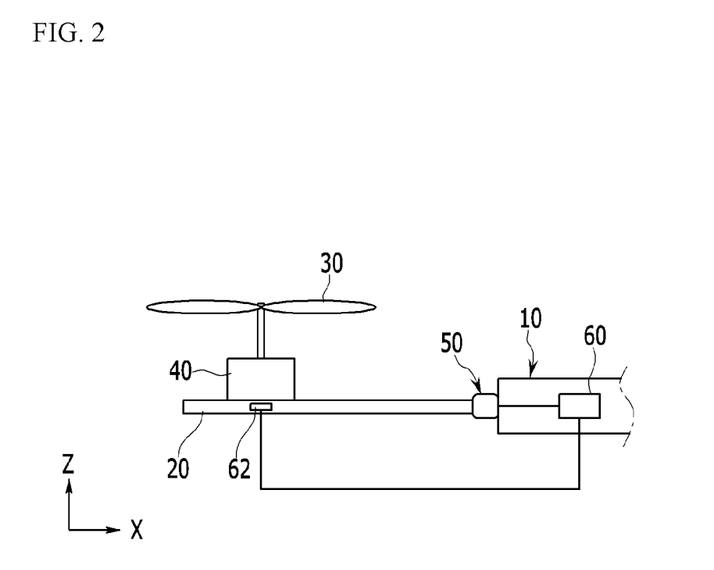
FIG. 2 is a schematic diagram of the unmanned aerial vehicle according to the exemplary embodiment of the present invention.

FIG. 1 and FIG. 2 schematically illustrate a configuration of an unmanned aerial vehicle according to an exemplary embodiment of the present invention.

FIG. 1 exemplarily illustrates an unmanned aerial vehicle 100 having a quadcopter structure, which includes four rotating rotors. The structure of the unmanned aerial vehicle 100 of the present exemplary embodiment is not limited to the quadcopter, and the unmanned aerial vehicle 100 may be, for example, applied to an unmanned aerial vehicle having a structure that includes various numbers of rotating rotors, such as a tricopter that includes three rotating rotors, a pentacopter that includes five rotating rotors, a hexacopter that includes six rotating rotors, and the like.

Hereinafter, the unmanned aerial vehicle 100 will be described as an unmanned aerial vehicle having a structure that includes four rotating rotors.

As shown in FIG. 1, the unmanned aerial vehicle 100 includes a main body 10, a plurality of support bars 20 that are arranged along a circumferential direction while forming an angle in the main body 10 and extend to an outer side from the main body 10, a plurality of rotating rotors 30 respectively provided in the support bars 20 and generating thrust, and a motor 40 connected with the respective rotating rotors 30 to drive the rotating rotors 30.

In the following description, reference numeral 20 denotes all support bars, and reference numerals 22, 24, 26, and 28 respectively denote the individual support bars. In addition, reference numeral 30 denotes all four rotating rotors, and reference numerals 32, 34, 36, and 38 respectively denote the individual rotating rotors.

The main body 10 is a center portion where the plurality of support bars 20 are provided, and parts for flight of the unmanned aerial vehicle 100, such as a battery, a communication module, or a controller that controls propulsion force of the rotating rotors 30 may be provided in the main body 10.

The support bar 20 has a structure that extends like a bar, and one end of the support bar 20 is provided in the main body 10 for support and the other end extends in a radial direction with respect to the main body 10. In the present exemplary embodiment, the support bars 20 are provided in the main body 10 while forming an angle of 90 degrees with respect to each other.

A motor 40 is provided in an outer end of each support bar 20, and the rotating rotor 30 is provided to a rotating shaft of the motor 40. Thus, when the motor 40 is driven, the rotating rotor 30 rotates such that thrust is generated. The unmanned aerial vehicle 100 controls rotation speed of each of the four rotating rotors 30 provided in the respective support bars 20 to control stability of the vehicle 100, and can move along three axes in the xyz coordinate system.

Hereinafter, for convenience of description, the x-axis direction is referred to as a forward-backward direction, the y-axis is referred to as a horizontal direction, and the z-axis direction is referred to as a vertical direction. In addition, when horizontal rotation of the unmanned aerial vehicle 100 with reference to the x-axis direction is called rolling movement, movement of the unmanned aerial vehicle 100 along the forward-backward direction with reference to the y-axis is called pitching movement, and rotation of the unmanned aerial vehicle 100 with reference to the z-axis direction is called yawing movement.

The unmanned aerial vehicle 100 having the quadcopter structure can perform normal flight when thrust is accurately controlled by the four rotating rotors 30. For example, in order to control the unmanned aerial vehicle 100 that is floated in the air while maintaining horizontal stability, a center of thrust of the unmanned aerial vehicle 100 should match a center of mass of the unmanned aerial vehicle 100, and the yawing movement that is performed with reference to the z-axis should be limited. The center of thrust may imply a spot where the sum of the rotation moments of all thrusts becomes zero, and the center of mass may imply a spot where the weight of the unmanned aerial vehicle 100 is horizontally balanced without leaning to one side. When the center of thrust mismatches the center of mass, a rotation moment that corresponds to a distance formed due to the mismatch of the center of thrust and the center of mass is generated so that stability cannot be horizontally controlled.

Accordingly, in FIG. 1, thrust of each rotating rotor 30 is synchronized with the others to match the center of thrust and the center of mass such that the unmanned aerial vehicle 100 can be horizontally balanced, and for example, a rotation direction of two facing rotating rotors 32 and 38 and a rotation direction of the other two rotating rotors 34 and 36 are set to be different from each other to control the yawing movement such that the unmanned aerial vehicle 100 can be prevented from being rotated by the principle of action and reaction. When one rotating rotor 30 of the unmanned aerial vehicle 100 malfunctions due to collision or a failure during flight, the center of thrust is fluctuated and rotation forces generated from the respective rotating rotors 30 cannot be offset from each other, and accordingly the unmanned aerial vehicle 100 cannot control the horizontal stability and thus it crashes.

Thus, when one rotating rotor of the unmanned aerial vehicle 100 according to the present exemplary embodiment malfunctions, the unmanned aerial vehicle 100 can control stability using other properly functioning rotating rotors.

For this, the unmanned aerial vehicle 100 according to the present exemplary embodiment includes drivers 50 that vary positions of the rotating rotors 30 along the circumferential direction of the main body 10 by moving the supports 20 with respect to the main body 10 and a controller 60 that maintains horizontal stability of the main body 10 by controlling the driver 50.

The control portion 60 includes a sensor 62 that detects whether or not each rotating rotor 30 controls so as to determine whether or not each rotating rotor 30 normally operates.

The sensor 62 may, for example, detect an abnormality in a current supplied to a motor that is provided in each rotating rotor 30 or detect whether or not the motor abnormally operates through an encoder. Any sensor that can detect whether or not the rotating rotor 30 malfunctions is applicable as the sensor 62.

In the present exemplary embodiment, the control portion 60 controls the respective drivers 50 to match the center of thrust from each rotating rotor 30 and the center of mass of the unmanned aerial vehicle 100. When one of the rotating rotors 30 among the plurality of rotating rotors 30 in the main body 10 stops, no thrust is generated from a location where the corresponding rotating rotor 30 is installed, and accordingly, the location of the center of thrust is changed while the center of mass of the unmanned aerial vehicle 100 is not changed. Thus, the control portion 60 moves the position of the rotating rotor 30 by controlling the driver 50 to relocate the location of the center of thrust at the center of mass to thereby balance the unmanned aerial vehicle 100.

Figure 3:
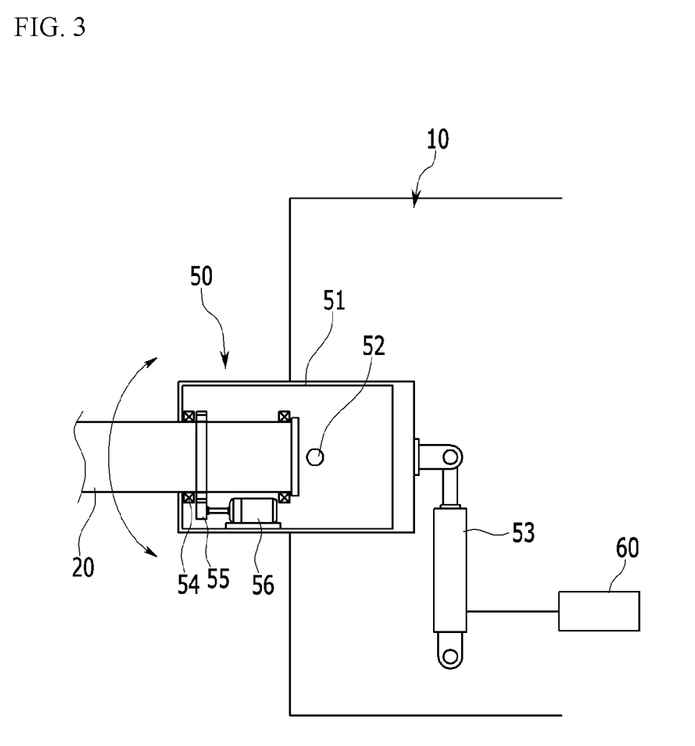
FIG. 3 and FIG. 4 are schematic diagrams of a driving structure of the unmanned aerial vehicle according to the exemplary embodiment of the present invention.

FIG. 3 exemplarily illustrates a structure of the driver 50. The driver 50 is provided in each of the support bars 20 that are provided in the main body 10, and each driver 50 has the same structure. The driver 50 provided in each support bar 20 is individually driven according to control of the controller 60. A support bar 20 selected according to a signal of the control portion 60 rotates with respect to the main body 10 to move the center of thrust.

As shown in FIG. 3, the driver 50 includes a shaft member 51 is rotatably coupled to the main body 10 by means of a shaft and to which the support bars 20 are fixed, and a rotation device that is provided between the main body 10 and the shaft member 51 to rotate the shaft member 51 with respect to the main body 10.

In the present exemplary embodiment, the rotation device may include a driving cylinder 53 that is connected between the shaft member 51 and the main body 10 and is extended according to a control signal of the controller 60 to rotate the shaft member 51.

The driver 50 is driven according to a signal of the control portion 60 to rotate the support bars 20 with respect to the main body 10. As the support bar 20 rotates with respect to the main body 10, the position of rotating rotor 30 provided to the support bar 20 is changed. Accordingly, the location of the center of thrust of the unmanned aerial vehicle 100 can be properly changed by changing the location where thrust is generated.

The shaft member 51 supports a front end of the support bar 20, and is rotatably coupled to the main body 10 by means of a rotation shaft 52. As shown in FIG. 3, the shaft member 51 is coupled to the main body 10 by means of a shaft so as to rotate along the x-y plane.

The driving cylinder 53 is driven by pneumatic pressure or hydraulic pressure, and opposite ends of the driving cylinder may be coupled to the shaft member 51 by means of a shaft. The driving cylinder 53 operates according to the control portion 60 to rotate the shaft member 51. A driving force is applied to the shaft member 51 as the driving cylinder 53 operates such that the shaft member 51 rotates with respect to the rotation shaft 52.

Since the support bar 20 is coupled to the shaft member 51, the support bar 20 also rotates with respect to the main body 10 as the shaft member 51 rotates with respect to the main body 10. As the support bar 20 rotates with respect to the main body 10, the position of the rotating rotor 30 installed at the front end of the support bar 20 moves with respect to the main body 10. The position of the rotating rotor 30, that is, the thrust generation location, is moved such that the thrust center location can be changed.

In addition, the driver 50 may further include a rotation unit that changes inclination of the rotating rotor 30 by changing the support bar 20 with respect to the shaft direction of the support bar 20. Here, the inclination of the rotating rotor 30 implies that the shaft of the rotating rotor 30 is inclined along a plane that is perpendicular to the shaft direction of the support bar 20.

In case of the quadcopter, the rotating rotor 30 is even numbered so that the yawing moment of the unmanned aerial vehicle 100 can be controlled by controlling thrust without changing the inclination of the rotating rotor 30. However, when one of the four rotating rotors 30 malfunctions and thus only three rotating rotors 30 operate, the inclinations of the rotating rotors 30 need to be changed so as to control the yawing movement of the unmanned aerial vehicle 100.

Thus, the unmanned aerial vehicle 100 according to the present exemplary embodiment is provided with a rotation unit to change the inclination of the rotating rotor 30, and thus even when one of the rotating rotors 30 malfunctions, yawing movement can be controlled, thereby maintaining horizontal stability of the unmanned aerial vehicle 100.

Figure 4:
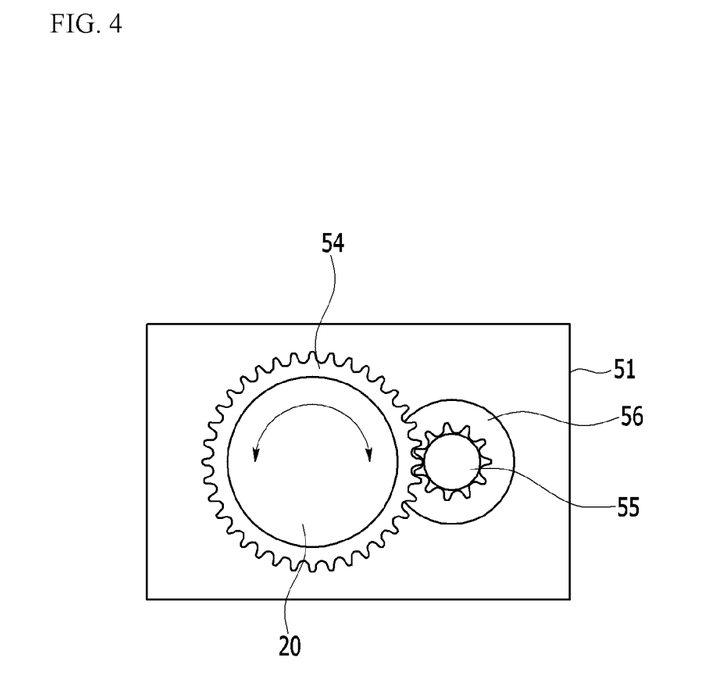

As shown in FIG. 3 and FIG. 4, the rotation unit may have a structure in which the support bar 20 is rotatably provided with respect to the shaft member 51, a driven gear 54 is provided along an outer circumferential side in the support bar 20, and a driving gear 55 that is engaged with the driven gear 54 and a forward motor 56 that rotates the driving gear 55 are provided in the shaft member 51.

The control portion 60 may drive the forward motor 56 to control the yawing movement of the main body 10 of the unmanned aerial vehicle 100.

The rotation unit is provided in each support bar 20 provided in the main body 10, and the respective rotation units have the same structure. The rotation unit provided in each support bar 20 is individually driven according to the control signal of the controller 60 as necessary. According to the control signal of the control portion 60, the rotation unit of each support bar 20 rotates the support bar 20 to thereby change the inclination of the rotating rotor 30.

The front end of the support bar 20 may be, for example, freely rotatably coupled to the shaft member 51 through a bearing block. In the present exemplary embodiment, the inclination of the rotating rotor 30 is changed by rotating the support bar 20 with respect to the shaft member 51, but this is not restrictive. For example, the support bar 20 may be fixed to the shaft member 51 and a shaft inclination of a motor 40 provided in the support bar 20 may be changed to thereby change the inclination of the rotating rotor 30.

The forward motor 56 may be provided in the shaft member 51, and forwardly rotates according to a driving signal of the controller 60. When the forward motor 56 is driven, the driving gear 55 rotates along one direction such that power is transferred to the support bar 20 through the driven gear 54 that is engaged with the driving gear 55. Accordingly, the support bar 20 rotates with respect to the shaft member 51. Then, the inclination of the rotating rotor 30 is changed and thus the yawing movement of the unmanned aerial vehicle 100 is controlled, and accordingly, the unmanned aerial vehicle 100 can be floated in the air while maintaining horizontal stability or may perform the yawing movement in a desired direction.

Hereinafter, referring to FIG. 5 and FIG. 6, a process for controlling stability of the unmanned aerial vehicle according to the present exemplary embodiment will be described.

The process for controlling the unmanned aerial vehicle according to the present exemplary embodiment includes detecting whether or not each rotating rotor provided in the main body normally operates and controlling for rearranging the respective rotating rotors by changing the positions of the rotating rotors along the circumferential direction of the main body when a rotating rotor abnormally operates.

The controlling is performed to locate the center of thrust of the unmanned aerial vehicle at the center of mass of the unmanned aerial vehicle for horizontal stability of the unmanned aerial vehicle.

In addition, when the yawing movement of the unmanned aerial vehicle needs to be controlled due to malfunctioning of the rotating rotor in the controlling, the support bar is rotated along the shaft direction to change the inclination of the rotating rotor, thereby stably controlling the yawing movement of the unmanned aerial vehicle.

Figure 5:
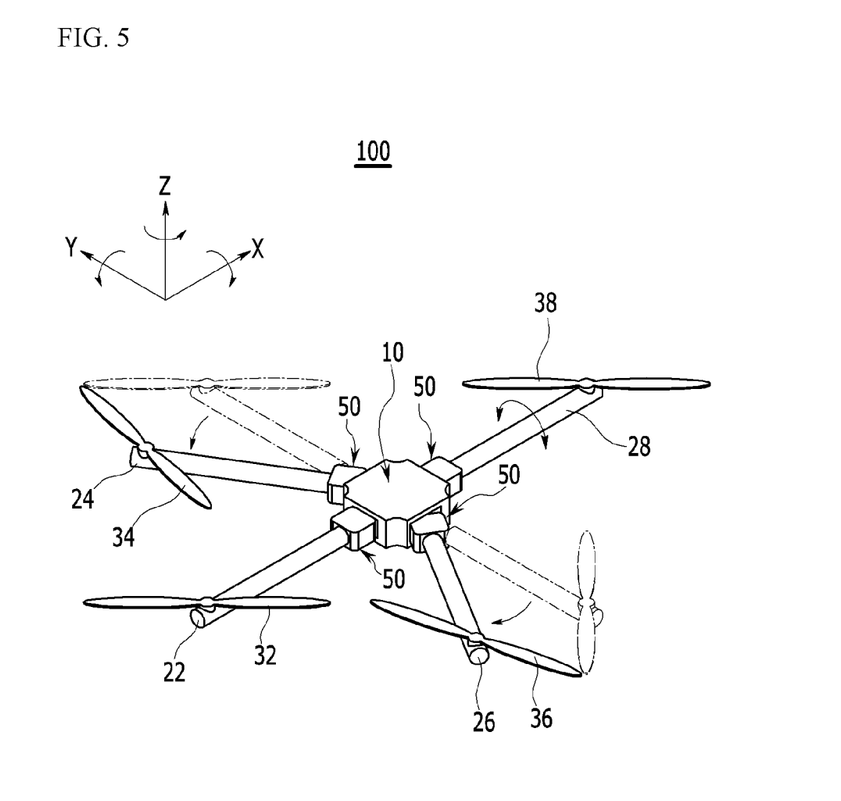
FIG. 5 and FIG. 6 schematically illustrate a stability control state of the unmanned aerial vehicle according to the exemplary embodiment of the present invention.
Figure 6:
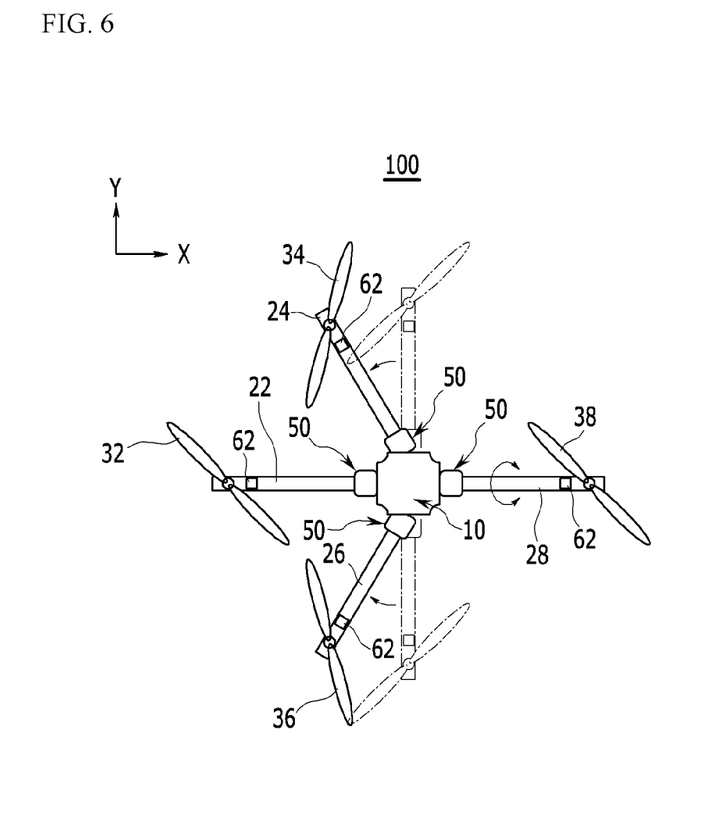

As show in FIG. 5 and FIG. 6, the unmanned aerial vehicle 100 has a quadcopter structure and thus is equipped with the four rotating rotors 32, 34, 36, and 38 and the four rotating rotors 32, 34, 36, and 38 are respectively provided in the four support bars 22, 24, 26, and 28 that are arranged while forming a 90 degree angle with respect to each other in the main body 10. When the four rotating rotors 32, 34, 36, and 38 normally operate and thus the unmanned aerial vehicle 100 flies in a horizontal stable state, the center of mass of the unmanned aerial vehicle 100 matches the center of the main body 10 and the center of thrust generated by the four rotating rotors 32, 34, 36, and 38 also matches the center of the main body 10, and accordingly the unmanned aerial vehicle 100 can maintain horizontal stability while being balanced.

When one of the four rotating rotors 32, 34, 36, and 38 malfunctions and thus stops rotating in such a state, thrust from the malfunctioning rotating rotor is reduced and thus the unmanned aerial vehicle 100 is imbalanced and the center of thrust mismatches the center of mass of the unmanned aerial vehicle 100.

As described, when one (e.g., rotating rotor 32) of the rotating rotors 32, 34, 36, and 38 abnormally operates, positions of the normally operating rotating rotors 34, 36, and 38 are changed to move the center of thrust to the center of the mass such that the quadcopter structure of the unmanned aerial vehicle 100 is changed to a tricopter structure to maintain stability.

That is, when the rotating rotor 32 abnormally operates, the abnormality of the corresponding rotating rotor 32 is detected by the sensor 62 that determines abnormality in the rotating rotors 32, 34, 36, and 38, and a detection signal is applied to the controller 60.

The control portion 60 operates the detection sensor of the sensor 62 to determine a position of the malfunctioning rotating rotor and move positions of rotating rotors that neighbor the malfunctioning rotating rotor.

According to the driving signal of the control portion 60, drivers 50 of the support bars 24 and 26 that neighbor the support bar 20 where the malfunctioning rotating rotor 32 is provided operate to rotate the support bars 24 and 26 with respect to the main body 10.

According to the operation of the drivers 50, the support bars 24 and 26 that are arranged in the y-axis direction in FIG. 6 rotate with respect to the main body 10 and thus move toward the support bar 22 where the malfunctioning rotating rotor 32 is provided. As the support bars 24 and 26 move, the positions of the rotating rotors 34 and 36 that are respectively provided in the support bars 24 and 26 also move toward the position of the malfunctioning rotating rotor 32. Accordingly, the location of thrust with respect to the main body 10 is changed as the positions of the rotating rotors that generate thrust are changed. That is, a change in a location of thrust causes a location of the center of thrust to be changed.

As two rotating rotors 34 and 35 move their positions, locations of centers of thrust generated from three normally operating rotating rotors 34, 36, and 38 also move to the center of the main body 10 where the center of mass of the unmanned aerial vehicle 100 is located. Here, although the location of the center of mass of the unmanned aerial vehicle 100 may be changed according to movement of the rotating rotors 34 and 36, locations of the center of thrust caused by the change of positions of the two rotating rotors 34 and 35 are controlled to be matched to the changed center of mass of the unmanned aerial vehicle 100 so that the location of the center of thrust can be precisely moved to the location of the changed center of mass of the unmanned aerial vehicle 100.

As described, the positions of the rotating rotors 34 and 36 that are located at lateral sides of the malfunctioning rotating rotor 32 are moved toward the malfunctioning rotating rotor 32 such that the location of the center of thrust matches the location of the center of mass of the unmanned aerial vehicle 100, thereby maintaining horizontal stability of the unmanned aerial vehicle 100.

Here, even when one (32) of the four rotating rotors 32, 34, 36, and 38 malfunctions and thus the other three normally operating rotating rotors 34, 36, and 38 are driven, at least one rotating rotor 38 can control the yawing movement of the unmanned aerial vehicle 100.

In FIG. 5, the inclination of the rotating rotor 38 that is disposed opposite to the malfunctioning rotating rotor 32, interposing the main body 10 along the x-axis, is changed by control of the controller 60 so as to control the yawing movement of the unmanned aerial vehicle 100.

Thus, the yawing movement of the unmanned aerial vehicle 100 can be controlled while being driven by only three normally operating rotating rotors 34, 36, and 38 such that the unmanned aerial vehicle 10 can maintain horizontal stability or rotate to a desired direction, centering the z-axis.

The forward motor 56 that is connected to the support bar 28 is driven according to the control signal of the control portion 60 such that the support bar 28 rotates, centering the x-axis with respect to the shaft member 51. As the support bar 28 rotates, the rotating rotor 38 provided in the support bar 28 is inclined to one side. Thus, the rotating rotor 38 inclined in the z-axis direction is inclined to the y-z plane such that a direction of thrust is changed. Accordingly, the unmanned aerial vehicle 100 can be horizontally floated in the air or rotates in a desired direction, centering the z-axis according to the inclination direction of the rotating rotor 38.

The unmanned aerial vehicle having four rotating rotors according to the present exemplary embodiment is described, but this is not restrictive. The unmanned aerial vehicle may have five or more rotating rotors and thus, when one of the five rotating rotors malfunctions, positions of the other four rotating rotors are moved to match the center of thrust to the center of mass, thereby maintaining stability in an emergency situation.

As described, when one rotating rotor malfunctions, positions of other normally operating rotating rotors are moved to promptly control stability by controlling of the unmanned aerial vehicle, thereby preventing the unmanned aerial vehicle from being imbalanced and thus crushed.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

<Description of symbols>

| | |
|---|---|
| 10: main body | 20, 22, 24, 26, 28: support bar |
| 30, 32, 34, 36, 38: rotating rotor | 40: motor |
| 50: driver | 51: shaft member |
| 52: rotation shaft | 53: driving cylinder |
| 54: driven gear | 55: drive gear |
| 56: forward motor | 60: controller |
| 62: sensor | |

What is claimed is:

1. An unmanned aerial vehicle comprising a main body, a plurality of support bars that are arranged while forming an angle with each other along a circumferential direction of the main body and extended to an outer side from the main body, a plurality of rotating rotors that are respectively provided to the support bars and generate thrust, and motors that are respectively connected to the rotating rotors to drive the rotating rotors,
   wherein the unmanned aerial vehicle further comprises drivers that change positions of the respective rotating rotors along the circumferential direction of the main body by moving the support bars with respect to the main body and a controller that is disposed within the main body and maintains horizontal stability of the main body by controlling the drivers, and
   wherein each driver comprises a shaft member that is disposed inside and outside the main body and is rotatably coupled to the main body by means of a shaft and a rotation device that is provided between the main body and the shaft member to rotate the shaft member with respect to the main body.

2. The unmanned aerial vehicle of claim 1, wherein the rotation device comprises a driving cylinder that is connected between the shaft member and the main body and rotates the shaft member by being expanded according to a control signal of the controller.

3. The unmanned aerial vehicle of claim 1, wherein the controller controls the driver to place the center of thrust generated from the rotating rotor at the center of mass of the unmanned aerial vehicle.

4. The unmanned aerial vehicle of claim 3, wherein the controller further comprises a sensor that detects whether or not each rotating rotor rotates and applies a detection result to the controller.

5. The unmanned aerial vehicle of claim 3, wherein the driver further comprises a rotation unit that changes an inclination of each rotating rotor by rotating the support bar with respect to the shaft direction.

6. The unmanned aerial vehicle of claim 5, wherein the support bar is provided in the rotation unit to be rotatable with respect to the shaft member, a driven gear is provided in the support bar along a circumferential surface of the support bar, and a driving gear that is engaged with the driven gear and a forward motor that rotates the driving gear are provided in the shaft member.

7. The unmanned aerial vehicle of claim 6, wherein the controller controls yawing movement of the main body by driving the forward motor.

8. A method for controlling stability of an unmanned aerial vehicle that includes a main body, a plurality of support bars that are arranged while forming an angle with each other along a circumferential direction of the main body and extended to an outer side from the main body, a plurality of rotating rotors that are respectively provided in the support bars and generate thrust, motors that are respectively connected to the rotating rotors to drive the rotating rotors, a driver comprising a shaft member that is disposed inside and outside the main body and is rotatably coupled to the main body by means of a shaft and a rotation device that is provided between the main body and the shaft member to rotate the shaft member with respect to the main body, wherein the driver changes positions of the respective rotating rotors along the circumferential direction of the main body by moving the support bars with respect to the main body, and a controller that is disposed within the main body and maintains horizontal stability of the main body by controlling the drivers, the method comprising
   detecting whether or not each rotating rotor provided in the main body abnormally operates and controlling for rearranging the respective rotating rotors by moving positions of the rotating rotors along a circumference direction of the main body through the driver controlled by the controller when an abnormality is detected in the rotating rotors.

9. The method for controlling stability of the unmanned aerial vehicle of claim 8, wherein, in the controlling, the positions of the rotating rotors are moved to locate the center of thrust of the unmanned aerial vehicle at the center of mass of the unmanned aerial vehicle.

10. The method for controlling stability of the unmanned aerial vehicle of claim 8, wherein the controlling further comprises controlling yawing movement for changing an inclination of a rotating rotor by rotating the corresponding support in a shaft direction.

* * * * *